United States Patent
Panasik et al.

(10) Patent No.: US 7,611,316 B2
(45) Date of Patent: Nov. 3, 2009

(54) HEAVY DUTY TOGGLE BOLT FASTENER FOR ACCOMMODATING LONG SCREWS AND HAVING PROPERLY POSITIONED TOGGLE NUT COMPONENT

(75) Inventors: Cheryl L. Panasik, Elburn, IL (US); Naim Mansour, Villa Park, IL (US); Richard J. Ernst, San Diego, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/059,652

(22) Filed: Feb. 17, 2005

(65) Prior Publication Data

US 2006/0182515 A1    Aug. 17, 2006

(51) Int. Cl.
*F16B 21/00* (2006.01)
(52) U.S. Cl. .................... 411/346; 411/340
(58) Field of Classification Search .......... 411/340–346
See application file for complete search history.

(56) References Cited

U.S. PATENT DOCUMENTS

| | | | | |
|---|---|---|---|---|
| 2,024,871 A | * | 12/1935 | Parsons | 411/342 |
| 2,908,196 A | * | 10/1959 | Apfelzweig | 411/344 |
| 3,127,807 A | * | 4/1964 | Modrey | 411/340 |
| 3,248,994 A | * | 5/1966 | Mortensen | 411/344 |
| 3,707,898 A | * | 1/1973 | Holly | 411/344 |
| 3,927,597 A | * | 12/1975 | Stults et al. | 411/341 |
| 4,043,245 A | * | 8/1977 | Kaplan | 411/346 |
| 4,120,231 A | * | 10/1978 | Neumayer | 411/340 |
| 4,285,264 A | * | 8/1981 | Einhorn | 411/345 |
| 4,370,083 A | * | 1/1983 | Burnett et al. | 411/87 |
| 4,449,873 A | * | 5/1984 | Barth | 411/341 |
| 4,601,625 A | * | 7/1986 | Ernst et al. | 411/387.4 |
| 4,822,226 A | * | 4/1989 | Kennedy | 411/342 |
| 5,067,864 A | * | 11/1991 | Dewey et al. | 411/344 |
| 5,108,240 A | * | 4/1992 | Liebig | 411/344 |
| 5,226,768 A | * | 7/1993 | Speer | 411/344 |

(Continued)

OTHER PUBLICATIONS

ITW Buildex, E-Z Products Self Drilling Drywall Anchors, downloaded frm http://www.itwbuildex.com/ezprod.htm, dated "Last Modifies Aug. 26, 2003", as verified at http://web.archive.org/web/20031207081042/http://www.itwbuildex.com/ezprod.htm, 5 pages.*

*Primary Examiner*—Victor Batson
*Assistant Examiner*—David C Reese
(74) *Attorney, Agent, or Firm*—Law Offices of Steven W. Weinrieb

(57) ABSTRACT

A toggle-bolt type fastener has pocket structure incorporated therein for accommodating extra-long threaded bolt fasteners in a coaxial manner within the toggle-bolt type fastener. Alternatively, structure has been incorporated within the toggle-bolt type fastener which accommodates extra-long threaded bolt fasteners by causing the same to be slightly deflected from their coaxial disposition within the toggle-bolt type fastener so as to permit the same to bypass the pointed tip of the toggle-bolt type fastener. Still further, additional structure has been incorporated within the toggle-bolt type fastener for ensuring the fact that when the nut member is moved from its original, axially oriented, inoperative or non-deployed position, to its second, transversely oriented, operative or deployed position, the nut member will in fact be disposed substantially perpendicular to the longitudinal axis of the toggle-bolt type fastener so as to ensure the proper threaded engagement thereby by the threaded bolt fastener.

27 Claims, 6 Drawing Sheets

U.S. PATENT DOCUMENTS

| | | | |
|---|---|---|---|
| 5,322,401 A * | 6/1994 | Vernet et al. | 411/344 |
| 5,803,688 A * | 9/1998 | Gleason et al. | 411/344 |
| 5,876,169 A * | 3/1999 | Wrigley | 411/344 |
| 6,250,865 B1 * | 6/2001 | McSherry | 411/344 |
| 6,318,941 B1 * | 11/2001 | Guenther | 411/342 |
| 6,435,789 B2 * | 8/2002 | Gaudron | 411/344 |
| 2006/0182515 A1 * | 8/2006 | Panasik et al. | 411/346 |

* cited by examiner

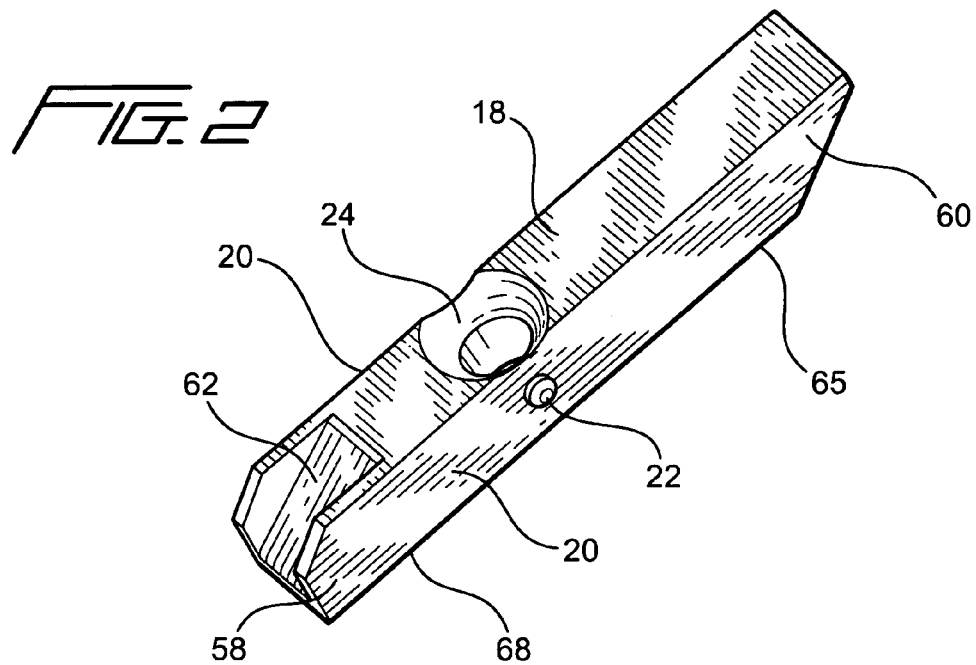
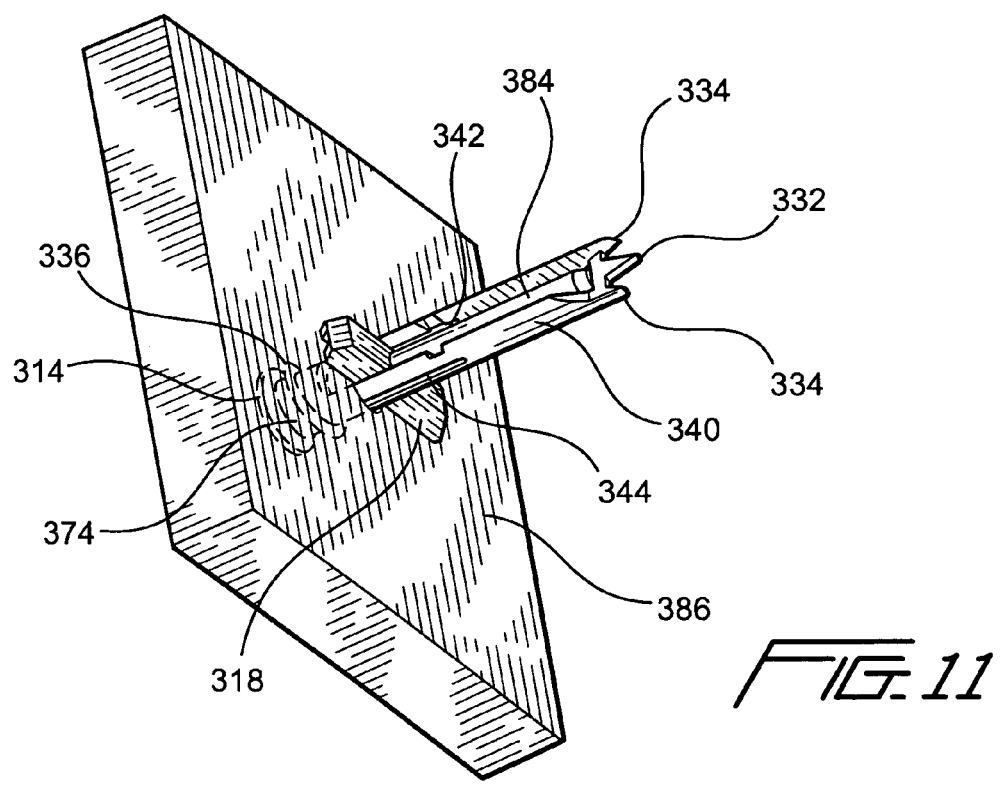

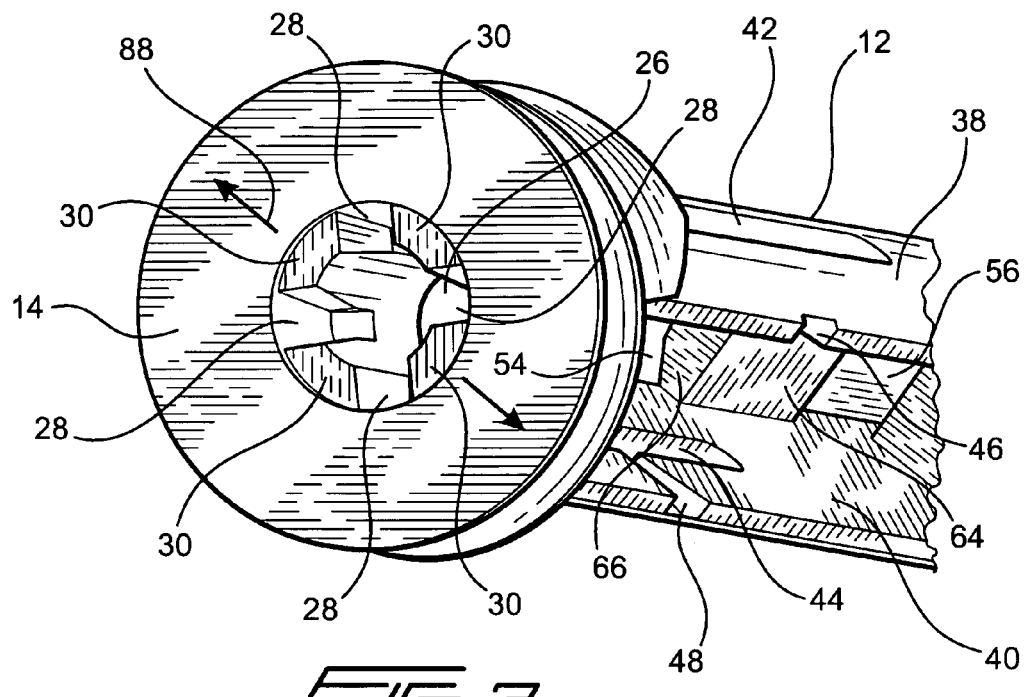
FIG. 3
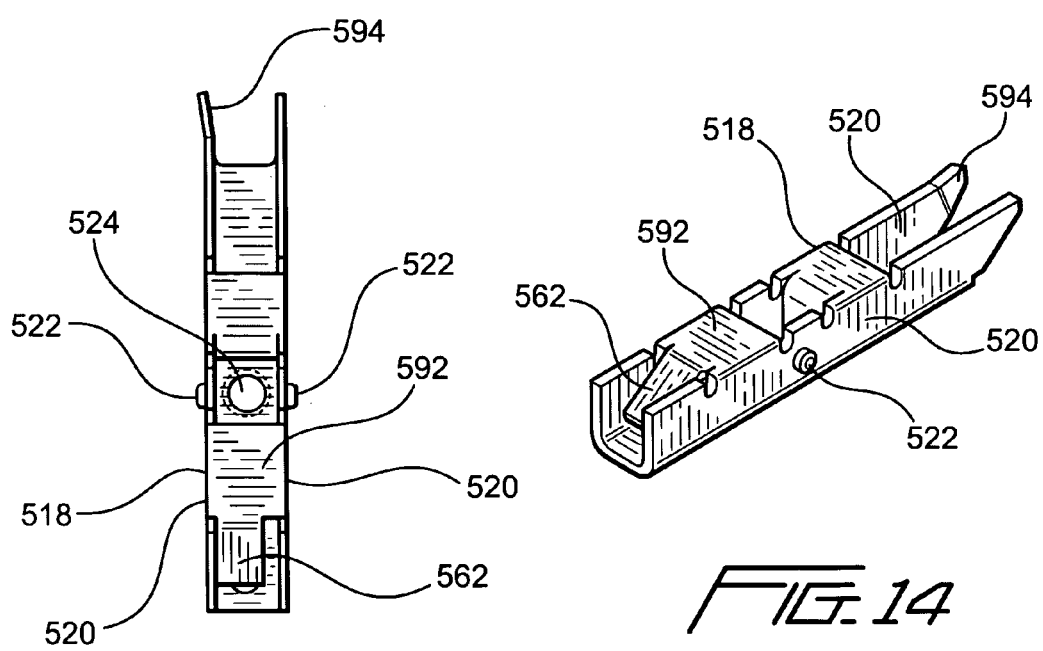
FIG. 13
FIG. 14

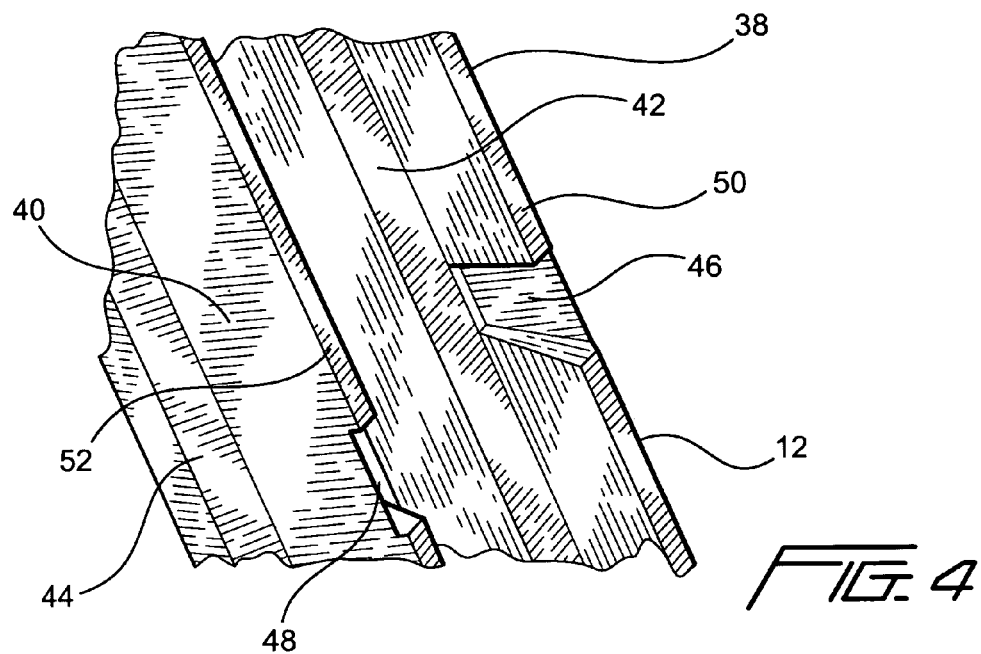
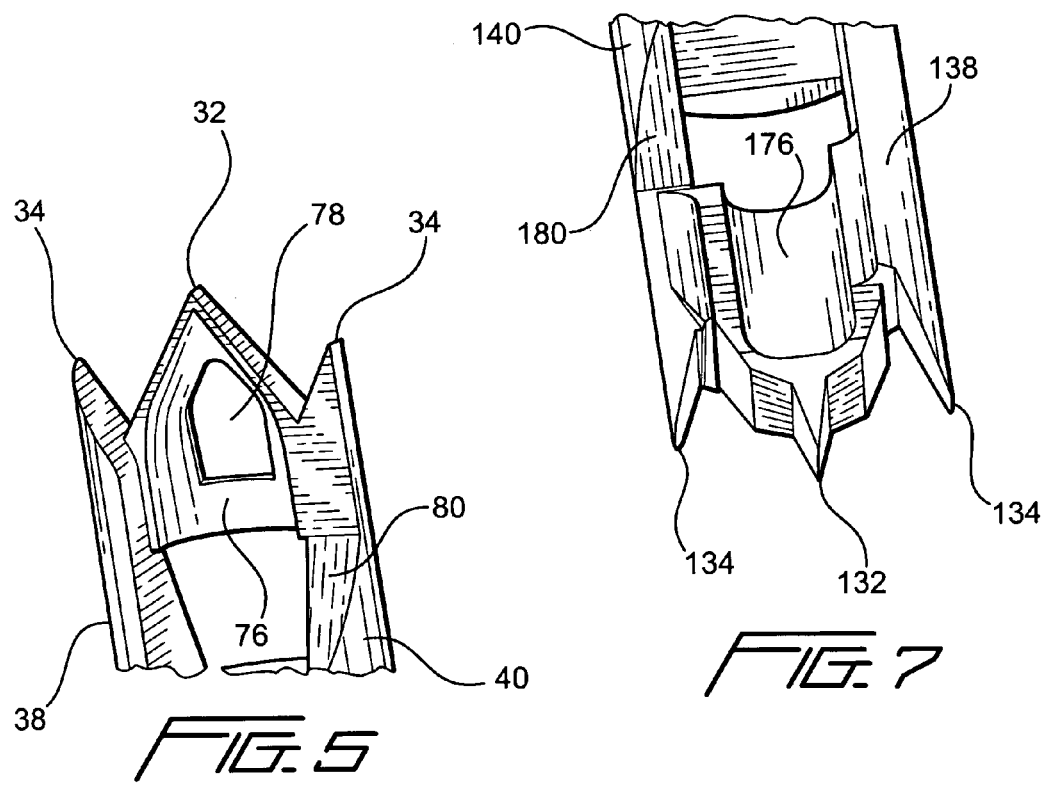

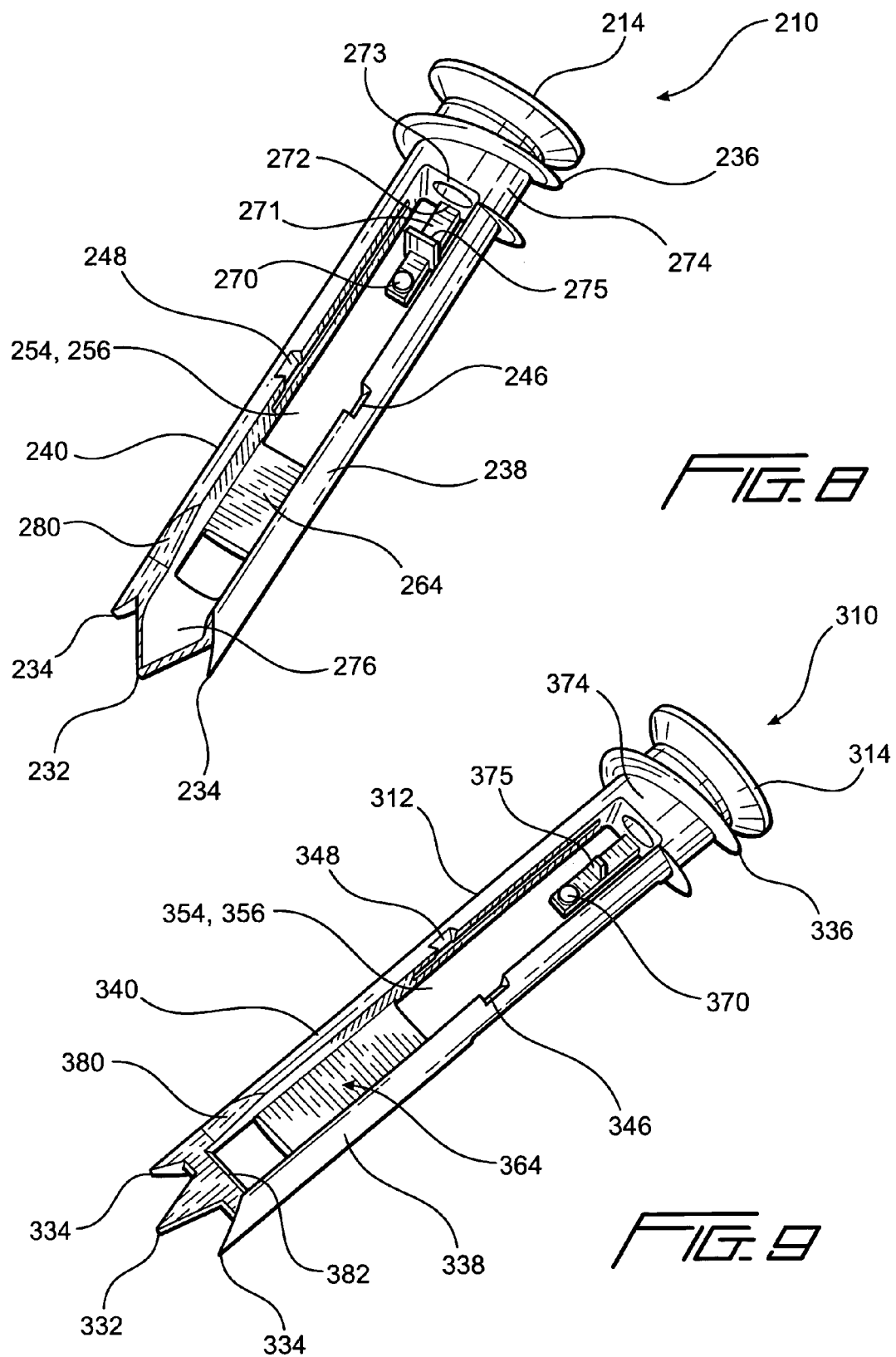

HEAVY DUTY TOGGLE BOLT FASTENER FOR ACCOMMODATING LONG SCREWS AND HAVING PROPERLY POSITIONED TOGGLE NUT COMPONENT

FIELD OF THE INVENTION

The present invention relates generally to toggle-bolt fastener assemblies for mounting various objects or articles, such as, for example, pictures, mirrors, shelving, lighting fixtures, brackets, and the like, upon drywall or support panel structures, and more particularly to a new and improved toggle-bolt fastener assembly which comprises structure for enabling the accommodation of extra-long screws and which effectively ensures the proper deployment of the toggle nut component from its coaxially aligned inoperative stored position to its perpendicular operative drywall-engaging position.

BACKGROUND OF THE INVENTION

Various toggle-bolt type fasteners have of course been developed within the past several decades, and are of course well-known in the building industry, wherein the toggle-bolt type fasteners have been specifically adapted for use in connection with the mounting of various objects or articles, such as, for example, pictures, mirrors, shelving, brackets, lighting fixtures, and the like, upon drywall structures. Typical fasteners of the aforenoted type are disclosed, for example, within U.S. Pat. No. 6,435,789 which issued on Aug. 20, 2002 to Gaudron, U.S. Pat. No. 6,250,865 which issued on Jun. 26, 2001 to McSherry, U.S. Pat. No. 5,876,169 which issued on Mar. 2, 1999 to Wrigley, U.S. Pat. No. 5,322,401 which issued on Jun. 21, 1994 to Vernet et al., U.S. Pat. No. 5,226,768 which issued on Jul. 13, 1993 to Speer, U.S. Pat. No. 5,108,240 which issued on Apr. 28, 1992 to Liebig, U.S. Pat. No. 5,067,864 which issued on Nov. 26, 1991 to Dewey et al., U.S. Pat. No. 4,449,873 which issued on May 22, 1984 to Barth, U.S. Pat. No. 4,285,264 which issued on Aug. 25, 1981 to Einhorn, and U.S. Pat. No. 4,043,245 which issued on Aug. 23, 1977 to Kaplan.

It has been recognized in the industry that toggle-bolt type fasteners are particularly desirable in view of the fact that as a result of the tightened engagement of the toggle members with respect to, or upon, the rear or inner side or surface portion of the drywall structure, enhanced pull-out resistance of the fastener, with respect to the drywall structure, can in fact be achieved whereby relatively large amounts of weight can effectively be supported upon the drywall structure. While the aforenoted types of toggle-bolt type fasteners have of course been generally satisfactory from an overall operational point of view, such fasteners do in fact exhibit some operational deficiencies. For example, in connection with such toggle-bolt type fasteners as disclosed within the aforenoted patents, a threaded screw or bolt fastener is used to pivotally move the toggle member from its first or original, axially oriented, inoperative or non-deployed position to its second, transversely oriented, operative or deployed position as the threaded screw or bolt fastener is inserted into the fastener body portion of the toggle-bolt type fastener. It is also noted that many of the aforenoted toggle-bolt type fasteners have self-drilling tip components which are obviously located along the longitudinal axis of the fastener so as to permit the toggle-bolt type fasteners to be rotated around the longitudinal axes thereof during the initial insertion of the toggle-bolt type fasteners into the drywall structure. Accordingly, the length or longitudinal extent of the threaded screw or bolt fastener that may be employed within any one of such toggle-bolt type fasteners is necessarily limited in that the tip portion of the threaded screw or bolt fastener cannot be permitted to engage the self-drilling tip portion because the threaded screw or bolt fastener would then effectively be prevented from being fully disposed within the toggle-bolt type fastener whereby it would not be possible to fixedly secure the toggle-bolt type fastener, as well as the particular object or article, upon the drywall structure. Therefore, different threaded screws or bolt fasteners must be predeterminedly selected for use within the particular toggle-bolt type fastener depending, for example, upon the thickness dimension of the article or object being fixedly secured upon the drywall structure.

Still further, as can also be appreciated from the disclosures contained within the aforenoted patents, while the disclosed toggle-bolt type fasteners comprise structural means integrally incorporated therein for achieving the pivotal movement of each toggle member from the first or original, axially oriented, inoperative or non-deployed position to the second, transversely oriented, operative or deployed position, as a result of being biased to the operative or deployed position by means of the threaded screw or bolt fastener inserted into the fastener body portion of the toggle-bolt type fastener, it sometimes happens that the threaded screw or bolt fastener does not always properly or accurately engage the toggle member so as to in fact cause the proper or complete pivotal movement of the toggle member from the first or original, axially oriented, inoperative or non-deployed position to the second, transversely oriented, operative or deployed position. Accordingly, when the threaded screw or bolt fastener is fully threadedly inserted or installed so as to securely mount the particular object or article upon the drywall structure, the toggle member will not properly or securely engage the rear or inner side or surface portion of the drywall structure whereby, in turn, the particular object or article will not be securely mounted upon the drywall structure.

A need therefore exists in the art for a new and improved toggle-bolt type fastener which comprises structure for enabling the accommodation of extra-long screws, whereby a single screw can be utilized within the toggle-bolt type fastener regardless of the thickness dimension of the particular article or object being mounted upon the drywall structure, and which effectively ensures the proper deployment of the toggle nut component from its first or original, axially oriented, inoperative or non-deployed position to its second, transversely oriented, operative or deployed drywall-engaging position.

SUMMARY OF THE INVENTION

The foregoing and other objectives are achieved in accordance with the teachings and principles of the present invention through the provision of a new and improved toggle-bolt type fastener which comprises a fastener body portion having a substantially cylindrically tubular cross-sectional configuration. A first pair of slots are provided within first, diametrically opposed side wall regions of the fastener body portion so as to permit pin members or trunnions of a pivotal nut member to slidably move therewithin, and a second pair of slots are provided within second, diametrically opposed side wall regions of the fastener body portion so as to permit the nut member to move from its first or original, axially oriented, inoperative or non-deployed position to its second, transversely oriented, operative or deployed position. A cross-brace member extends across one of the side wall portions of the fastener body portion, at a position immediately forwardly of the first pair of slots defined within the fastener body portion, and effectively spans one of the second slots, through which a portion of the nut member passes as the nut member moves from its first or original, axially oriented, inoperative or non-deployed position to its second, transversely oriented, operative or deployed position, such that the nut member will engage the cross-brace member when the nut member effectively attains its second, transversely oriented, operative or deployed position. In this manner, the cross-brace member effectively ensures the fact that the nut member is properly disposed at its transversely oriented, operative or deployed position which is substantially perpendicular to the longitudinal axis of the toggle-bolt type fastener such that proper threaded engagement of the nut member, by means of the threaded screw or bolt fastener, is effectively ensured.

Still further, the self-drilling tip portion of the toggle-bolt type fastener includes an arcuately curved portion which extends inwardly from the outer periphery of the toggle-bolt type fastener toward the longitudinal axis thereof, along which the actual self-drilling stab point is located, such that when an extra-long threaded screw or bolt fastener begins to engage the self-drilling tip portion of the toggle-bolt type fastener, the forward end tip portion of the threaded screw or bolt-type fastener will effectively be guided, by means of the arcuate curvature characteristic of the self-drilling tip portion, into engagement with the self-drilling stab point whereby the threaded screw or bolt fastener can be slightly deflected from its coaxial disposition with respect to the toggle-bolt type fastener and thereby effectively bypass the self-drilling stab point of the toggle-bolt type fastener. In this manner, the toggle-bolt type fastener can in fact accommodate extra-long threaded screws or bolt fasteners whereby a single threaded screw or bolt fastener can be utilized regardless of the thickness dimensions of the various articles or objects being mounted upon the drywall structure. It is also noted that the slight deflection of the threaded screw or bolt fastener from its coaxial disposition with respect to the toggle-bolt type fastener does not adversely affect the threaded engagement defined between the threaded screw or bolt fastener and the nut member of the toggle-bolt type fastener in view of the fact that, at this point in time, the threaded screw or bolt fastener has already been properly threadedly engaged with the nut member. Still yet further, alternative structure may likewise be incorporated within the body portion of the toggle-bolt type fastener, just immediately rearwardly of the self-drilling pointed tip, so as not to necessarily cause the aforenoted slight deflection of the threaded screw or bolt fastener but, to the contrary, simply permit the tip portion of the extra-long threaded screw or bolt fastener to be simply parked or accommodated.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 2 is a perspective view of a solid nut member which may be utilized within the toggle-bolt type fastener disclosed within FIG. 1;

FIG. 3 is a perspective view of the head end portion of the toggle-bolt type fastener, as disclosed within FIG. 1, wherein the slots, defined within oppositely disposed side wall portions of the toggle-bolt type fastener for permitting or facilitating the mounting of the nut member, as disclosed within FIG. 2, upon the toggle-bolt type fastener, are disclosed;

FIG. 4 is an enlarged view showing the details of the slot structure, as disclosed within FIG. 3 for permitting or facilitating the mounting of the nut member, as disclosed within FIG. 2, upon the toggle-bolt type fastener as disclosed within FIG. 1;

FIG. 5 is a partial, internal perspective view of the first embodiment of the new and improved toggle-bolt type fastener as disclosed within FIG. 1 and showing the details of the self-drilling tip portion of the toggle-bolt type fastener;

FIG. 7 is a partial, internal perspective view, similar to that of FIG. 5, showing, however, the details of the self-drilling tip portion of the second embodiment toggle bolt type fastener as disclosed within FIG. 6;

FIG. 8 is an internal side perspective view, similar to those of FIGS. 1 and 6, showing, however, a third embodiment of a new and improved toggle-bolt type fastener constructed in accordance with the principles and teachings of the present invention and showing the various cooperative parts thereof for likewise achieving the operational objectives of the present invention comprising the proper disposition of the nut member and the accommodation of extra-long threaded screws or bolt fasteners;

FIG. 9 is an internal side perspective view, similar to any one of those of FIGS. 1, 6 and 8, showing, however, a fourth embodiment of a new and improved toggle-bolt type fastener constructed in accordance with the principles and teachings of the present invention and showing the various cooperative parts thereof for likewise achieving the operational objectives of the present invention comprising the proper disposition of the nut member and the accommodation of extra-long threaded screws or bolt fasteners;

FIG. 11 is a perspective view, corresponding to those of FIGS. 9 and 10, showing, however, the mounting of the toggle-bolt type fastener within a drywall structure, and the insertion of a threaded screw or bolt fastener into the toggle-bolt type fastener so as to cause the nut member to now be disposed at its second, transversely oriented, operative or deployed position;

FIG. 13 is a top plan view of a second embodiment of a nut member fabricated from sheet metal material as opposed to comprising a solid nut member as has been previously disclosed within FIGS. 2 and 10; and FIG. 14 is a perspective view of the nut member disclosed within FIG. 13.

DETAILED DESCRIPTION OF THE PREFERRED EMBODIMENT

Figure 1:
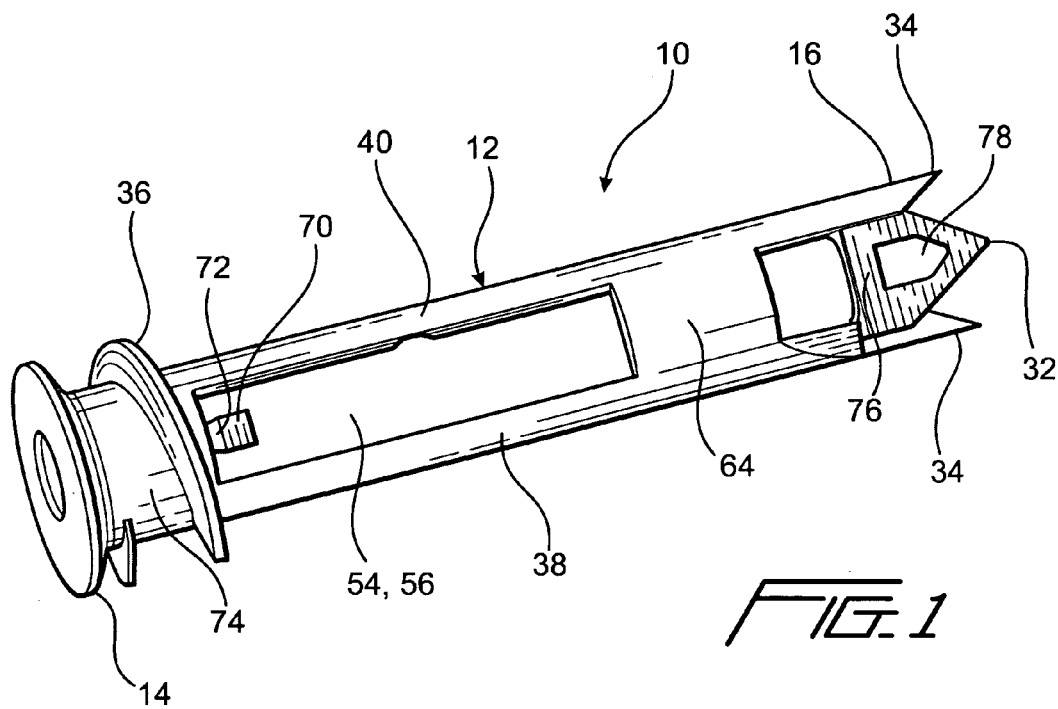
FIG. 1 is an external side perspective view of a first embodiment of a new and improved toggle-bolt type fastener constructed in accordance with the teachings and principles of the present invention and showing the various cooperative parts thereof for achieving the operational objectives of the present invention comprising the proper disposition of the nut member and the accommodation of extra-long threaded screws or bolt fasteners.

Referring now to the drawings, and more particularly to FIGS. 1-4 thereof, a first embodiment of a new and improved toggle-bolt type fastener, constructed in accordance with the principles and teachings of the present invention and showing the various cooperative parts thereof for achieving the operational objectives of the present invention, is disclosed and is generally indicated by the reference character 10. More particularly, it is seen that the new and improved toggle-bolt type fastener 10 is seen to comprise a body portion 12, a head portion 14 integrally connected to one end of the body portion 12, and a self-drilling tip portion 16 integrally connected to an opposite end of the body portion 12. The body portion 12 has a substantially cylindrically tubular cross-sectional configuration, and it is noted that the thickness of the peripheral wall member of the body portion 12 is approximately 0.072 inches, which effectively imparts a sufficient degree of reinforcement to the peripheral wall member of the body portion 12 so as to effectively improve the torsional strength of the peripheral wall member of the body portion 12 in order to prevent deformation of the same during installation of the toggle-bolt type fastener 10 by means of, for example, a screw gun.

Continuing further, as can best be seen from FIG. 2, a solid nut member 18 is adapted to be mounted upon the body portion 12 of the toggle-bolt type fastener 10, and in order to in fact mount the solid nut member 18 upon the body portion 12 of the toggle-bolt type fastener 10, opposite side walls 20,20 of the solid nut member 18 are respectively provided with pivot pins or trunnions, only one of which is visible at 22. The nut member 18 is also provided with an internally threaded bore 24 for threaded engagement by means of a threaded activation screw or bolt fastener, not shown, and the head portion 14 of the toggle-bolt type fastener 10 is provided with an axially located bore 26, as can best be seen in FIG. 3, for receiving the shank portion of the threaded activation screw or bolt fastener, not shown, in a closely tolerated manner so as to assuredly guide the threaded activation screw or bolt fastener in a coaxial manner into the body portion 12 of the toggle-bolt type fastener 10 so as to effectively ensure the subsequent threaded engagement of the threaded activation screw or bolt fastener with the internally threaded bore 24 defined within the nut member 18. Alternatively, in lieu of the pre-threaded bore 24, splined structure may be incorporated within the nut member 18 so as to accommodate a self-tapping operation by means of the threaded activation screw or bolt fastener. In this manner, different threaded activation screws or bolt fasteners, having differently sized diametrical extents, can be accommodated within the nut member 18 of the toggle-bolt type fastener 10. It is noted further that the outermost end portion of the axial bore 26, defined within the head portion 14 of the toggle-bolt type fastener 10, is partially slotted or splined, as at 28, by means of four radially inwardly projecting, circumferentially spaced islands 30, so as to accommodate corresponding structure of a suitable rotary tool, not shown, such as, for example, a tool bit of a screw gun, such that the toggle-bolt type fastener 10 may be rotatably inserted into the drywall structure. In order to facilitate the insertion of the toggle bolt type fastener 10 into the drywall structure, the self-drilling tip portion 16 of the toggle-bolt type fastener 10 is seen to comprise an axially located stab point 32 which initially locates the toggle-bolt type fastener 10 at the point of entry into the drywall structure, and a pair of diametrically op-posed, arcuately-shaped cutting blade members 34,34 located radially outwardly from the axially located stab point 32 for effectively cutting the outer paper covering of the drywall structure and for subsequently drilling the hole in the drywall structure within which the toggle-bolt type fastener 10 is to be installed. The head portion 14 of the toggle-bolt type fastener 10 is also provided with a large-diameter, coarsely pitched external screw thread 36, on the order, for example, of 0.612 inches, which enhances the pull-out resistance of the toggle-bolt type fastener 10 with respect to the drywall structure.

With continued reference being made to FIGS. 1-4, it is seen that the body portion 12 of the toggle-bolt type fastener 10 comprises a pair of diametrically opposed side wall members 38,40, and that each one of the diametrically opposed side wall members 38,40 has an axially oriented through-slot 42,44 respectively defined therein. The pair of axially oriented through-slots 42,44 permit the pivot pins or trunnions 22 of the nut member 18 to travel therewithin after the nut member 18 has been engaged by means of the threaded activation screw or bolt fastener, not shown, so as to move the nut member 18 from its first or original, axially oriented, inoperative or non-deployed position, to its second, transversely oriented, operative or deployed position, and after the threaded activation screw or bolt fastener has threadedly engaged the internally threaded bore 24 of the nut member 18 so as to cause the nut member 18 to travel longitudinally toward the head portion 14 of the toggle-bolt type fastener 10.

It is further seen or appreciated that each one of the diametrically opposed side wall members 38,40 is also respectively provided with a transversely oriented slot 46,48 upon the interior surface portion thereof such that the transversely oriented slots 46,48 are disposed at opposed, parallel locations with respect to each other, and that the transversely oriented slots 46,48 respectively extend inwardly from one of the external edge portions 50,52 of each side wall member 38,40 toward the axially oriented through-slots 42,44 of the particular side wall member 38,40 so as to in fact intersect the axially oriented through-slots 42,44. In addition, as can best be seen from FIG. 4, each one of the transversely oriented slots 46,48 has a tapered configuration as the same extends inwardly from its respective external edge portion 50,52 to its respective axially oriented through-slot 42,44. In this manner, the transversely oriented slots 46,48 not only permit or facilitate the mounting of the pivots pins or trunnions 22 of the nut member 18 therewithin so as to, in turn, permit or facilitate the mounting of the nut member 18 within the toggle-bolt type fastener 10, but, in addition, the tapered configuration of each one of the transversely oriented slots 46,48 requires the pivot pins or trunnions 22 of the nut member 18 to effectively be force-fitted through the transversely oriented slots 46,48 and be snap-fitted into the axially oriented through-slots 42,44.

Continuing further, as a result of the diametrically opposite disposition of the side wall members 38,40, a second pair of diametrically opposed, axially oriented through-slots 54,56 are effectively defined, within the tubular body portion 12 of the toggle-bolt type fastener 10, between the diametrically opposed side wall members 38,40, wherein it is also noted that the second pair of diametrically opposed through-slots

54,56 are disposed within a plane which is oriented perpendicular to the plane within which the first pair of through-slots 42,44 are defined. It can therefore be appreciated that when the threaded activation screw or bolt fastener is inserted through the head portion 14 of the toggle-bolt type fastener 10 and engages the nut member 18 so as to effectively cause the pivotal movement of the nut member 18, around an axis defined by means of its pivot pins or trunnions 22 disposed within the first pair of through-slots 42,44, from its first or original, axially oriented, inoperative or non-deployed position to its second, transversely oriented, operative or deployed position, opposite ends 58,60 of the nut member 18 will respectively move outwardly through the second pair of through-slots 54,56 such that the nut member 18 will ultimately be disposed substantially perpendicular to the longitudinal axis of the toggle-bolt type fastener 10. In conjunction with such pivotal movement of the nut member 18 first or original, axially oriented, inoperative or non-deployed position to its second, transversely oriented, operative or deployed position, it is additionally noted that the rear end of the nut member 18 is provided with a ramp section 62 which is adapted to be engaged by the forward tip portion of the threaded activation screw or bolt fastener, not shown, as the threaded screw or bolt fastener is inserted into and through the head portion 14 of the toggle-bolt type fastener 10.

Such engagement of the ramp section 62 of the nut member 18 by means of the tip portion of the threaded activation screw or bolt fastener, not shown, will initially cause the nut member 18 to undergo the aforenoted pivotal movement of the same around the axis defined by means of its pivot pins or trunnions 22 so as to permit the tip portion of the threaded activation screw or bolt fastener to ultimately engage the internally threaded bore 24 of the nut member 18 and begin the longitudinal or axial movement of the nut member 18 toward the head portion 14 of the toggle-bolt type fastener 10. Furthermore, in conjunction with the movement of the nut member 18 from its first or original, axially oriented, inoperative or non-deployed position to its second, transversely oriented, operative or deployed position, it is seen that the body portion 12 of the toggle-bolt type fastener 10 also comprises a cross brace member 64 which spans the through-slot 54 defined between one of the pair of side edge portions of the oppositely disposed side wall members 38,40 and is integrally connected to such side edge portions of the side wall members 38,40 at a position which is located a predetermined distance forwardly of the forward terminal ends of the first pair of through-slots 42,44 as can best be seen in FIGS. 1 and 3. In addition to serving as a structural framework component for effectively preventing torsional twisting of the body portion 12 of the toggle-bolt type fastener 10 when the toggle-bolt type fastener 10 is inserted into drywall structure by means of, for example, a suitable screw gun, it can also be appreciated that the cross-brace member 64 will effectively support the undersurface or rear surface portion 65 of the forward end portion 60 of the nut member 18, when the nut member 18 is disposed at its first or original, axially oriented, inoperative or non-deployed position within the body portion 12 of the toggle-bolt type fastener 10, and prior to the engagement of the nut member 18 by means of the threaded activation screw or bolt fastener, not shown, so as to effectively ensure that the nut member 18 cannot, at this point in time, pivotally move in a first predetermined angular direction, around the axis defined by means of its pivot pins or trunnions 22, whereby, for example, the forward end portion 60 of the nut member 18 would move through the through-slot 54 while the rear end portion 58 of the nut member 18 would move through the through-slot 56.

In this manner, the nut member 18 will in fact be properly disposed at its first or original, axially oriented, inoperative or non-deployed position within the body portion 12 of the toggle-bolt type fastener 10 so as to ensure that the tip portion of the threaded activation screw or bolt fastener, not shown, will properly engage the ramp section 62 of the nut member 18. It is additionally seen that the cross-brace member 64 comprises a rearwardly disposed or rearwardly-facing transversely oriented surface portion 66, and consequently, it can therefore be appreciated that when the nut member 18 is pivotally moved to its second, transversely oriented, operative or deployed position, an undersurface or rear surface portion 68 of the nut member 18, within the vicinity of the rearward end portion 58 of the nut member 18, will be moved into contact with the surface portion 66 of the cross-brace member 64 such that the nut member 18 will now be disposed in a position or orientation which is substantially perpendicular to the longitudinal axis of the toggle-bolt type fastener 10. Accordingly, the internally threaded bore 24 of the nut member 18 will be able to be properly threadedly engaged by means of the threaded activation screw or bolt fastener, not shown, inserted into and through the head portion 14 of the toggle-bolt type fastener 10.

It is lastly noted that, in connection with the pivotal movement of the nut member 18 from its first or original, axially oriented, inoperative or non-deployed position to its second, transversely oriented, operative or deployed position, just as the cross-brace member 64 effectively prevented the nut member 18 from undergoing a predetermined pivotal movement whereby the forward end portion 60 of the nut member 18 would pivotally move outwardly through the through-slot 54, and the rear end portion 58 of the nut member 18 would pivotally move outwardly through the through slot 56, a tab member 70 may be integrally connected, by means of a suitable frangible connection portion 72, to a forward-facing surface portion of the shank portion 74, upon which the coarse thread 36 is formed, so as to likewise operatively engage or contact an external surface portion of the rear end portion 58 of the nut member 18 and thereby retain the nut member 18 at its predetermined first or original, axially oriented, inoperative or non-deployed position. Accordingly, the nut member 18 is likewise prevented from undergoing an opposite predetermined pivotal movement around the axis defined by means of the pivot pins or trunnions 22 whereby the rear end portion 58 of the nut member 18 would pivotally move outwardly through the through-slot 54 while the forward end portion 60 of the nut member 18 would pivotally move outwardly through the through-slot 56.

When the threaded activation screw or bolt fastener, not shown, is therefore inserted into and through the head portion 14 and the shank portion 74 of the coarse thread 36, the forward tip portion of the threaded activation screw or bolt fastener will initially engage the ramp section 62 of the nut member 18, and therefore the nut member 18 will effectively move axially or longitudinally between the oppositely disposed side wall members 38,40, as permitted by means of the pivot pins or trunnions 22 slidably moving within the 42,44 of the side wall members 38,40. Subsequently, when the rear end portion 58 of the nut member 18 clears the tab member 70, the nut member 18 will effectively be released from its contact engagement with the tab member 70 whereby continued engagement of the threaded activation or bolt fastener, not shown, with the ramp section 62 of the nut member 18 will initiate the desired pivotal movement of the nut member 18 from its first or original, axially oriented, inoperative or non-deployed position to its second, transversely oriented, operative or deployed position so as to permit the threaded screw or bolt fastener to threadedly engage the internally threaded bore 24 of the nut member 18. It is to be noted still further that the mounting of the tab member 70 upon the forward-facing surface portion of the shank portion 74 by means of the frangible connection portion 72 will permit the tab member 70 to be frangibly broken from, or bent with respect to, the forward-facing surface portion of the shank portion 74 when the toggle-bolt type fastener 10 is mounted within a relatively thin wall member and when the nut member 18 is threadedly drawn toward the front or interior face of the wall member as a result of the threaded engagement of the threaded activation or bolt fastener, not shown, within the internally threaded bore 24 of the nut member 18.

It is to be lastly noted in connection with the first embodiment of the new and improved toggle-bolt type fastener 10, as disclosed within FIG. 1, and as additionally disclosed within FIG. 5, that the self-drilling tip portion 16 further comprises pocket structure 76 which is integrally connected to both the axially located stab point 32 at the forwardmost extent thereof as well as to the pair of diametrically opposed, arcuately-shaped cutting blade members 34,34 along side edge portions thereof. More particularly, it is noted that the rearward portion of the pocket structure 76, which is integrally connected along its side edge portions to the pair of diametrically opposed, arcuately-shaped cutting blade members 34,34, has a substantially cylindrically tubular configuration which is radially offset from the longitudinal axis of the toggle-bolt type fastener 10 by means of a distance equal to one-half the diametrical extent of the threaded activation screw or bolt fastener, while the forwardmost end portion of the pocket structure 76, which integrally connects the aforenoted cylindrically tubular rearward portion of the pocket structure 76 to the axially located stab point 32 of the toggle-bolt type fastener 10, has a substantially conical configuration. In accordance with the foregoing structural characteristics, it can therefore be further appreciated that the pocket structure 76 can effectively accommodate or house the forwardmost tip portion of a relatively long threaded activation screw or bolt fastener, not shown, without encountering the axially located stab point 32 of the toggle-bolt type fastener 10 which would normally or conventionally be integrally connected to the pair of diametrically opposed, arcuately-shaped cutting blade members 34,34 by means of a transversely oriented cross-bar. The use of a relatively long threaded activation screw or bolt fastener, wherein the extra length could be, for example, on the order of 0.375 inches, is advantageous in that not only does it permit thicker articles or objects to be fixedly mounted upon the drywall structure, but in addition, a single threaded activation screw or bolt fastener can be utilized regardless of the thickness dimensions of the various articles or objects to be fixedly mounted upon the drywall structure.

It is noted that an aperture 78, having a substantially house-shaped configuration, is formed within a central region of the peripheral wall member comprising the pocket structure 76 as a result of the manufacturing techniques employed in connection with the fabrication of the pocket structure 76 when it is desired to provide the peripheral wall member of the pocket structure 76 with a relatively thin thickness dimension so as to, in turn, provide the stab point 32 with a predetermined thickness dimension, or a predetermined degree of sharpness, in order to facilitate the easy penetration of the same into the drywall structure when insertion of the toggle-bolt type fastener 10 into the drywall structure is to be initiated. It is noted still further that as a result of the fact that the forwardmost end portion of the pocket structure 76, which integrally connects the aforenoted cylindrically tubular rearward portion of the pocket structure 76 to the axially located stab point 32 of the toggle-bolt type fastener 10, has a substantially conical configuration, an extra-long threaded activation screw or bolt fastener can likewise be accommodated within the toggle-bolt type fastener 10 in that the forward tip portion of the threaded activation screw or bolt fastener will simply ride up or ramp up the interior conically-shaped contours of the forwardmost end portion of the pocket structure 76 so as to effectively bypass the axially located stab point 32.

As a last structural feature integrally incorporated upon the toggle-bolt type fastener 10, it is noted that a debris ramp 80 is provided upon, for example, the side wall member 40 at a position immediately rearwardly of the arcuately-shaped cutting blade member 34 disposed upon the side wall member 40 so as to effectively route debris, generated as a result of the cutting and drilling of the drywall structure by means of the pair of oppositely disposed arcuately-shaped cutting blade members 34,34, toward the hollow axially central region of the toggle-bolt type fastener 10 from which the debris can effectively be automatically discharged either externally or internally of the drywall structure. In this manner, the insertion and penetration of the toggle-bolt type fastener 10 into the drywall structure will not be impeded.

Figure 6:
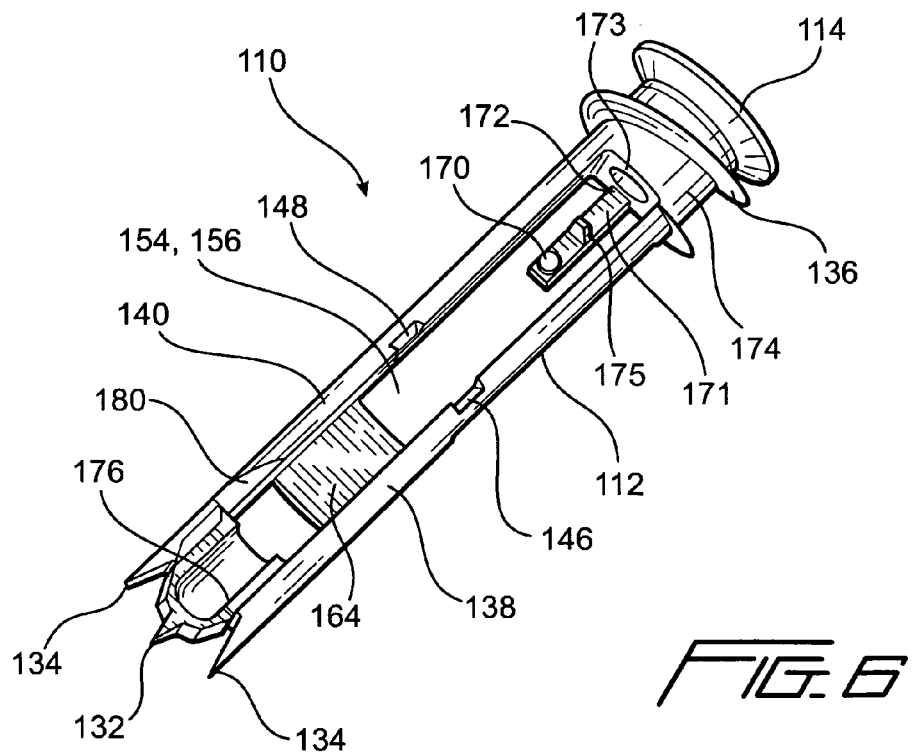
FIG. 6 is an internal side perspective view, similar to that of FIG. 1, showing, however, a second embodiment of a new and improved toggle-bolt type fastener constructed in accordance with the principles and teachings of the present invention and showing the various cooperative parts thereof for likewise achieving the operational objectives of the present invention comprising the proper disposition of the nut member and the accommodation of extra-long threaded screws or bolt fasteners.

With reference now being made to FIGS. 6 and 7, a second embodiment of a new and improved toggle-bolt type fastener, constructed in accordance with the teachings and principles of the present invention and showing the various cooperative parts thereof for likewise achieving the operational objectives of the present invention comprising the proper disposition of the nut member and the accommodation of extra-long threaded screws or bolt fasteners, is disclosed and is generally indicated by the reference character 110. It is firstly noted that in the interest of brevity, those structural components of the toggle-bolt type fastener 110, which correspond or are similar to those structural components of the toggle-bolt type fastener 10, will not be discussed in detail, but to the contrary, the discussion of the toggle-bolt type fastener 110 will be limited to the structural differences that exist between the toggle-bolt type fastener 110 and the toggle-bolt type fastener 10, and secondly, those structural components of the toggle-bolt type fastener 110, which correspond or are similar to those structural components of the toggle-bolt type fastener 10, will be designated by similar reference characters except that they will be within the 100 series. More particularly, it is seen that the toggle-bolt type fastener 110 comprises pocket structure 176 similar to the pocket structure 76 integrally incorporated within the toggle-bolt type fastener 10, however, in lieu of the pocket structure 176 having the substantially composite semi-cylindrical and semi-conical configuration characteristic of the pocket structure 76 wherein the structure was integrally connected to the stab point 32, the pocket structure 176 solely comprises a semi-cylindrical component which is axially spaced from the stab point 132 and is only integrally connected along its side edge portions to the pair of diametrically opposed arcuately-shaped cutting blade members 134, 134.

Still further, it is also seen that the toggle-bolt type fastener 110 comprises a lug 170 which is formed upon the distal end of an axially extending projection 171 and which is adapted to engage the nut member, not shown in the drawing figure, so as to retain the nut member at its first or original, axially oriented, inoperative or non-deployed position within the toggle-bolt type fastener 110. The projection 171 is integrally fixed, by means of a frangible connection 172, at its proximal end to the forwardly facing surface portion 173 of the shank portion 174 upon which the coarse thread 136 is formed, and a transversely oriented tab member 175 is fixedly mounted upon a central region of the projection 171 so as to be engageable by the threaded activation screw or bolt fastener, not shown. When the tab member 175 is in fact so engaged by the threaded activation screw or bolt fastener, the projection 171 will be deflected away from its normal axial disposition, the lug 170 will be disengaged from the nut member so as to release the nut member, the projection 171 will be broken away at its frangible connection 172, and the threaded activation screw or bolt fastener will proceed to operatively engage the nut member so as to pivotally move the same from its first or original, axially oriented, inoperative or non-deployed position to its second, transversely oriented, operative or deployed position.

With reference now being made to FIG. 8, a third embodiment of a new and improved toggle-bolt type fastener, constructed in accordance with the teachings and principles of the present invention and showing the various cooperative parts thereof for likewise achieving the operational objectives of the present invention comprising the proper disposition of the nut member and the accommodation of extra-long threaded screws or bolt fasteners, is disclosed and is generally indicated by the reference character 210. It is again noted that in the interest of brevity, those structural components of the toggle-bolt type fastener 210, which correspond or are similar to those structural components of the toggle-bolt type fasteners 10,110 will not be discussed in detail, but to the contrary, the discussion of the toggle-bolt type fastener 210 will be limited to the structural differences that exist between the toggle-bolt type fasteners 10,110 and the toggle-bolt type fastener 210, the structural components of the toggle-bolt type fastener 210 being designated by reference numbers within the 200 series. More particularly, it is noted that the only significant difference between the toggle-bolt type fastener 210 and the toggle-bolt type fastener 110 resides in the fact that in lieu of the semi-cylindrical pocket structure 176 as utilized within the toggle-bolt type fastener 110, the pocket structure 276 utilized within the toggle-bolt type fastener 210 is similar to the pocket structure 76 utilized within the toggle-bolt type fastener 10, although it is noted further that the thickness dimension of the pocket structure 276 is slightly larger than that of the pocket structure 76 such that an aperture, similar to the aperture 78, is not present within the pocket structure 276.

Figure 10:
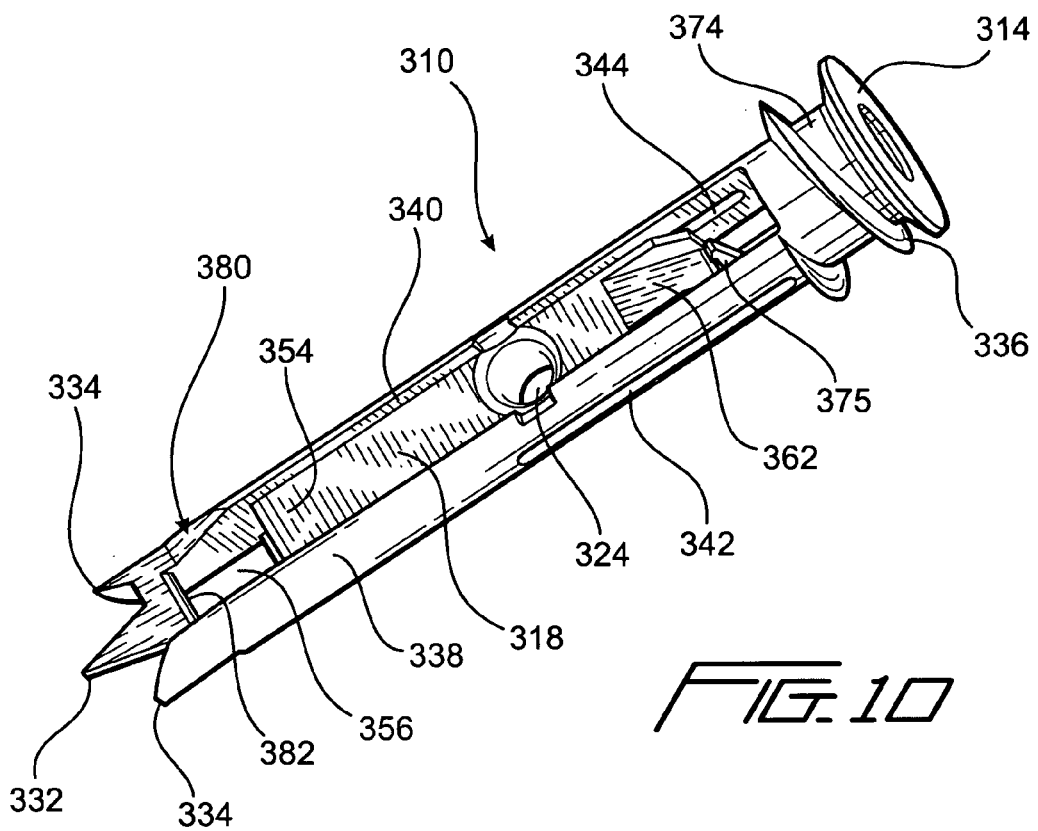
FIG. 10 is a perspective view, corresponding to that of FIG. 9, showing, however, the mounting of the nut member within the body portion of the toggle-bolt type fastener when the nut member is disposed at its first, original, axially oriented, inoperative or non-deployed position.

With reference now being made to FIGS. 9-11, a fourth embodiment of a new and improved toggle-bolt type fastener, constructed in accordance with the teachings and principles of the present invention and showing the various cooperative parts thereof for likewise achieving the operational objectives of the present invention comprising the proper disposition of the nut member and the accommodation of extra-long threaded screws or bolt fasteners, is disclosed and is generally indicated by the reference character 310. It is again noted that in the interest of brevity, those structural components of the toggle-bolt type fastener 310, which correspond or are similar to those structural components of the toggle-bolt type fasteners 10,110,210 will not be discussed in detail, but to the contrary, the discussion of the toggle-bolt type fastener 310 will be limited to the structural differences that exist between the toggle-bolt type fasteners 10,110,210 and the toggle-bolt type fastener 310, the structural components of the toggle-bolt type fastener 310 being designated by reference numbers within the 300 series. More particularly, it is noted that the stab point 332 comprises a planar member transversely spanning and integrally connecting the pair of diametrically opposed, arcuately-shaped cutting blade members 334,334, the length of the oppositely disposed side wall members 338,340 is slightly longer than that of a conventional toggle-bolt type fastener, and a rear edge portion 382 of the planar stab point 332 is likewise accordingly positioned at a more forward position than is conventionally the case with prior art toggle-bolt fasteners. Accordingly, the forward end portions of the oppositely disposed side wall members 338,340, as well as the spaces 354,356 effectively defined therebetween, together with the rear edge portion 382 of the planar stab point 332, effectively define the pocket structure 376 so as to permit an extra-long, threaded activation screw or bolt fastener 384 to in fact be accommodated or housed within the toggle-bolt type fastener 310, as illustrated within FIG. 11, when the extra-long, threaded activation screw or bolt fastener 384 is fully threaded within the nut member 318 so as to tightly seat the nut member 318 upon the inner surface of the drywall structure or panel member 386. It is also noted that the nut member 318 preferably has the longest length or longitudinal extent as is possible because a greater amount of surface area provided upon the nut member 318 is able to be seated upon the inner surface of the drywall structure 386 which serves to significantly enhance pull-out resistance characteristics of the toggle-bolt type fastener 310.

Still yet further, as can be clearly appreciated from FIG. 3, but as equally applicable to each one of the toggle-bolt type fasteners 10,110,210,310, each head portion 14,114,214,314 of each toggle-bolt type fastener 10,110,210, 310 is preferably provided with arrow indicia 88 such that when the particular toggle-bolt type fastener 10,110,210,310 is in fact inserted within the drywall structure 386, it is preferable that operator personnel rotate the toggle-bolt type fastener 10,110,210,310 within the drywall structure 386 until the arrow indicia 88 is disposed within a vertical plane. The disposition of the arrow indicia 88, upon each one of the head portions 14,114,214,314 of each one of the toggle-bolt type fasteners 10,110,210,310, is correlated in a coplanar manner with the provision of the slots 54,56,154, 156,254,256,354, 356,454,456 through which the opposite ends of the nut members, as exemplified by means of nut members 18,318, of the particular toggle-bolt type fasteners 10,110, 210,310, will project when the nut members, as exemplified by means of nut members 18,318, are disposed at their second, transversely oriented, operative or deployed positions. Accordingly, the nut members, as exemplified by means of nut members 18,318, will be disposed within a vertical plane which also enhances or maximizes the pull-out resistance of the particular toggle-bolt type fastener 10,110,210,310 due to the shear forces acting upon the drywall structure 386.

Figure 12:
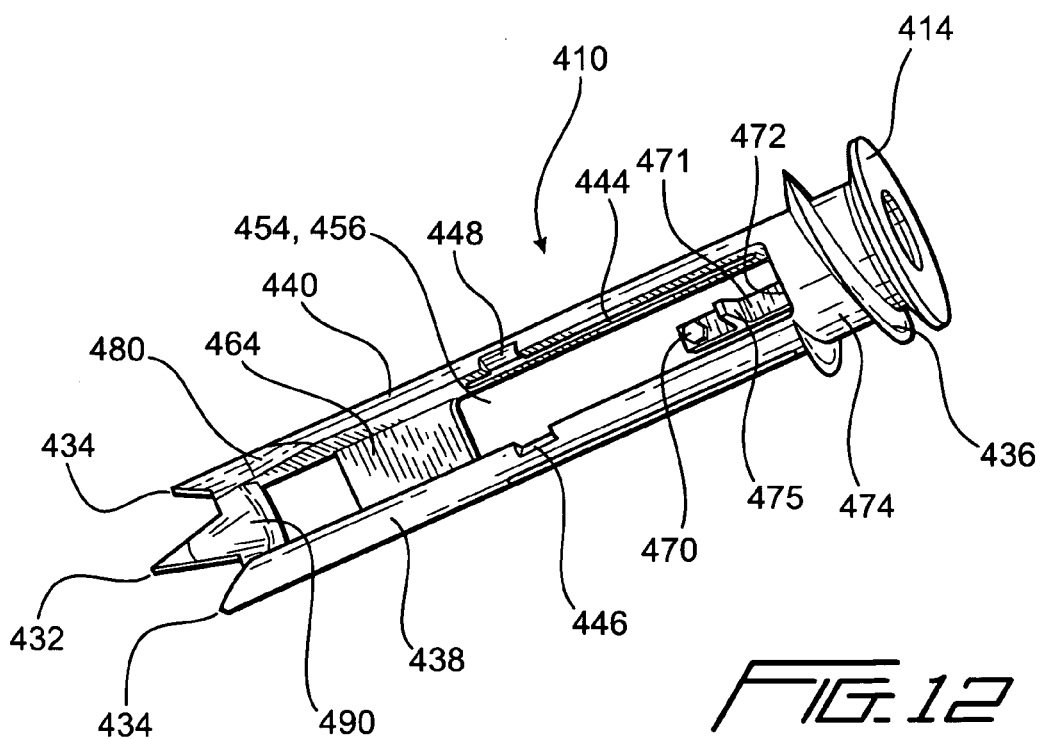
FIG. 12 is an internal side perspective view, similar to any one of those of FIGS. 1, 6, 8 and 9, showing, however, a fifth embodiment of a new and improved toggle-bolt type fastener constructed in accordance with the principles and teachings of the present invention and showing the various cooperative parts thereof for likewise achieving the operational objectives of the present invention comprising the proper disposition of the nut member and the accommodation of extra-long threaded screws or bolt fasteners.

With reference now being made to FIG. 12, a fifth embodiment of a new and improved toggle-bolt type fastener, constructed in accordance with the teachings and principles of the present invention and showing the various cooperative parts thereof for likewise achieving the operational objectives of the present invention comprising the proper disposition of the nut member and the accommodation of extra-long threaded screws or bolt fasteners, is disclosed and is generally indicated by the reference character 410. It is again noted that in the interest of brevity, those structural components of the toggle-bolt type fastener 410, which correspond or are similar to those structural components of the previously disclosed toggle-bolt type fasteners 10,110,210, 310 will not be discussed in detail, but to the contrary, the discussion of the toggle-bolt type fastener 410 will be limited or confined to the structural differences that exist between the toggle-bolt type fasteners 10,110,210,310 and the toggle-bolt type fastener 410, the structural components of the toggle-bolt type fastener 310 being designated by reference numbers within the 400 series.

More particularly, it is noted that in lieu of the pocket structures 176,276, and 382 disclosed within the toggle-bolt type fasteners 110,210, and 310, and in a manner similar to that previously disclosed in connection with the pocket structure 76 of the toggle-bolt type fastener 10, deflection structure 490 is incorporated within the toggle-bolt type fastener 410, wherein the deflection structure 490 has a semi-conical configuration which gradually tapers up to, and smoothly integrates into, the stab point 432. Accordingly, when the forward tip portion of the threaded, activation screw or bolt fastener, not shown in the drawing, encounters the deflection structure 490, the semi-conically shaped deflection structure 490 will effectively guide the forward tip portion of the threaded, activation screw or bolt fastener into engagement with the side surface portion of the stab point 432 whereby the side surface portion of the stab point 432 will effectively cause a slight deflection of the forward portion of the threaded, activation screw or bolt fastener whereby the threaded activation screw or bolt fastener will be slightly deflected from its normal coaxial disposition within the toggle-bolt type fastener 410. Accordingly, the forward portion of the threaded, activation screw or bolt fastener can bypass the stab point 432. It can therefore be appreciated that the toggle-bolt type fastener 410 can effectively accommodate extra-long threaded, activation screws or bolt fasteners.

With reference lastly being made to FIGS. 13 and 14, a second embodiment of a nut member fabricated from sheet metal material, as opposed to comprising a solid nut member as has been previously disclosed within FIGS. 2 and 10, is disclosed and is indicated by the reference character 518. While the solid nut members 18,318 as disclosed within FIGS. 2 and 10 may be fabricated from solid aluminum, steel, plastic, zinc, or the like, and may be fabricated by any one of molding, machining, die casting, or punch pressing techniques, the nut member 518 is fabricated from a suitable sheet metal material which is appropriately folded in a predetermined manner so as to attain the illustrated configuration.

In particular, it is seen that a central portion of nut member 518 is provided with a threaded bore 524, pivot pins or trunnions 522,522 are stamped along the side wall members 520, 520 thereof, and a ramp member 562 is folded downwardly from the upper wall member 592 thereof. It is also noted that at least one of the side wall members 520,520 has a bent ear portion, or a tab, 594 disposed at the forward end portion of the nut member 518 so as to effectively frictionally engage an interior wall portion of one of the side wall members of the toggle-bolt type fastener body portion. In this manner, the nut member 518 is retained at its first or original, axially oriented, inoperative or non-deployed position until the threaded, activation screw or bolt fastener is inserted into the toggle-bolt type fastener and encounters the ramp portion 562 of the nut member 518 so as to cause the same to be released and subsequently moved to its second, transversely oriented, operative or deployed position. In lieu of the bent ear or tab 594, a suitable dimple may also be provided.

Thus, it may be seen that in accordance with the principles and teachings of the present invention, there has been disclosed a new and improved toggle-bolt type fastener wherein pocket structure has effectively been incorporated so as to accommodate extra-long threaded activation screws or bolt fasteners in a coaxial manner within the toggle-bolt type fastener, or alternatively, structure has been incorporated within the toggle-bolt type fastener which effectively accommodates extra-long threaded activation screws or bolt fasteners by causing the same to be slightly deflected from their coaxial disposition within the toggle-bolt type fastener so as to permit the same to bypass the stab point of the toggle-bolt type fastener. Still further, additional structure has also been incorporated within the toggle-bolt type fastener for ensuring the fact that when the nut member is moved from its first or original, axially oriented, inoperative or non-deployed position to its second, transversely oriented, operative or deployed position, the nut member will in fact be disposed substantially perpendicular to the longitudinal axis of the toggle-bolt type fastener so as to, in turn, ensure the proper threaded engagement thereby by means of the threaded activation screw or bolt fastener.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A toggle-bolt fastener assembly for mounting articles upon a panel member, comprising:
    a body portion, having a longitudinal axis, to be mounted within a panel member;
    a head portion integrally formed upon a first end portion of said body portion;
    a pointed tip portion integrally formed upon a second opposite end portion of said body portion;
    a threaded fastener;
    a nut member mounted upon said body portion for movement between a first inoperative position, oriented substantially coaxially within said body portion, so as to permit said body portion to be inserted into the panel member, and a second operative position, oriented substantially perpendicular to said longitudinal axis of said body portion, so as to permit said nut member to be threadedly engaged by said threaded fastener whereby said body portion can be fixedly mounted within the panel member;
    a first pair of oppositely disposed slots defined within a first pair of oppositely disposed sections of said body portion for permitting opposite ends of said nut member to move through said first pair of slots when said nut member is moved from said first inoperative position, oriented substantially coaxially within said body portion, to said second operative position, oriented substantially perpendicular to said longitudinal axis of said body portion, so as to attain said second operative position, oriented substantially perpendicular to said longitudinal axis of said body portion, in order to fixedly retain said body portion mounted within the panel member;
    a cross-brace member, integrally interconnecting said first pair of oppositely disposed sections of said body portion, for engaging said nut member when said nut member is disposed at said first inoperative position, oriented substantially coaxially within said body portion, so as to effectively define said first, inoperative position of said nut member, oriented substantially coaxially within said body portion, and for also engaging said nut member when said nut member is disposed at said second operative position, oriented substantially perpendicular to said longitudinal axis of said body portion, so as to define said second operative position, oriented substantially perpendicular to said longitudinal axis of said body portion, and thereby ensure that said nut member will be properly threadedly engaged by said threaded fastener;
    a pair of pivot pins disposed upon side wall portions of said nut member for permitting said nut member to be pivotally moved from said first inoperative position, oriented substantially coaxially within said body portion, to said second operative position, oriented substantially perpendicular to said longitudinal axis of said body portion; and a second pair of oppositely disposed slots defined within second oppositely disposed sections of said body portion for permitting said pivot pins of said nut member to move therewithin as said nut member is moved axially within said toggle-bolt fastener as said nut member is continually threadedly engaged by the threaded fastener, forward end portions of said second pair of slots being disposed rearwardly of said cross-brace member such that when said nut member is pivotally moved from said first inoperative position, oriented substantially coaxially within said body portion, to said second operative position, oriented substantially perpendicular to said longitudinal axis of said body portion, said nut member will engage said cross-brace member whereby said cross-brace member will ensure that said nut member will be disposed substantially perpendicular to said longitudinal axis of said body portion so as to be properly threadedly engaged by said threaded fastener.

2. The toggle-bolt fastener as set forth in claim 1, wherein:
said nut member comprises a solid nut member.

3. The toggle-bolt fastener as set forth in claim 2, wherein:
said solid nut member is fabricated from a material selected from the group comprising aluminum, steel, plastic, and zinc.

4. The toggle-bolt fastener assembly as set forth in claim 1, wherein:
said nut member is fabricated from folded sheet metal.

5. The toggle-bolt fastener assembly as set forth in claim 4, wherein:
a projection, selected from the group consisting of a bent ear, a tab, and a dimple, is provided upon said sheet metal nut member so as to retain said sheet metal nut member at said first, inoperative position, oriented substantially coaxially within said body portion.

6. The toggle-bolt fastener assembly as set forth in claim 1, further comprising:
arrow indicia disposed upon said head portion of said toggle-bolt fastener in a coplanar manner with said first pair of slots defined within said body portion, through which said opposite ends of said nut member will move, when said nut member is moved from said first axially oriented, inoperative position within said body portion, to said second operative position, oriented substantially perpendicular to said longitudinal axis of said body portion, so as to indicate to operator personnel the orientation of said opposite ends of said nut member whereby said nut member may be oriented vertically so as to maximize pullout resistance values of said toggle-bolt fastener.

7. The toggle-bolt fastener assembly as set forth in claim 1, further comprising:
pocket structure, defined within said body portion so as to be radially offset from said longitudinal axis of said body portion and to be disposed axially rearwardly of said pointed tip portion, for accommodating a threaded fastener within said body portion of said toggle-bolt fastener such that a forward tip portion of said threaded fastener will not encounter said pointed tip portion of said toggle-bolt fastener whereby a single threaded fastener can mount different articles, having different thickness dimensions, upon the panel member while said single threaded fastener remains coaxially disposed within said toggle-bolt fastener.

8. The toggle-bolt fastener assembly as set forth in claim 7, wherein:
said pocket structure comprises a composite semi-cylindrical, semi-conical structure integrally interconnecting opposite side wall members of said body portion of said toggle-bolt type fastener and said pointed tip portion of said toggle-bolt fastener.

9. The toggle-bolt fastener assembly as set forth in claim 7, wherein:
said pocket means comprises a semi-cylindrical structure integrally interconnecting opposite side wall members of said body portion of said toggle-bolt fastener.

10. The toggle-bolt fastener assembly as set forth in claim 7, wherein:
said pocket structure is defined by a pair of opposite side wall members of said body portion of said toggle-bolt fastener, said first pair of slots which are defined within said body portion between said pair of opposite side wall members for permitting said opposite ends of said nut member to move through said first pair of slots when said nut member is moved from said first inoperative position, oriented substantially coaxially within said body portion, to said second operative position, oriented substantially perpendicular to said longitudinal axis of said body portion, and a rear edge portion of said pointed tip portion.

11. The toggle-bolt fastener assembly as set forth in claim 1, further comprising:
pocket means, defined within said body portion so as to be radially offset from said longitudinal axis of said body portion and to be disposed axially rearwardly of said pointed tip portion, for accommodating a threaded fastener within said body portion of said toggle-bolt fastener such that a forward tip portion of said threaded fastener will encounter said pointed tip portion of said toggle-bolt fastener and will be slightly deflected by said pointed tip portion of said toggle-bolt fastener whereby a single threaded fastener can mount different articles, having different thickness dimensions, upon the panel member as a result of said forward tip portion of said single threaded fastener bypassing said pointed tip portion of said toggle-bolt fastener.

12. The toggle-bolt fastener assembly as set forth in claim 11, wherein:
said pocket means comprises a composite semi-cylindrical, semi-conical structure integrally interconnecting opposite side wall members of said body portion of said toggle-bolt fastener and said pointed tip portion of said toggle-bolt fastener.

13. The toggle-bolt fastener assembly as set forth in claim 11, wherein:
said pocket means comprises a composite semi-conical structure integrally interconnecting opposite side wall members of said body portion of said toggle-bolt fastener and said pointed tip portion of said toggle-bolt fastener.

14. A toggle-bolt fastener assembly for mounting articles upon a panel member, comprising:
a body portion to be mounted within a panel member, said body portion having a longitudinal axis, and comprising a first pair of oppositely disposed side wall members, and a second pair of oppositely disposed side wall members;
a nut member mounted upon said body portion for movement between a first inoperative position, oriented substantially coaxially within said body portion, so as to permit said body portion to be inserted into the panel member, and a second operative position, oriented substantially perpendicular to said longitudinal axis of said body portion, so as to permit said nut member to be threadedly engaged by a threaded fastener whereby said body portion can be fixedly mounted within the panel member;

a first pair of slots defined between said first pair of oppositely disposed side wall members of said body portion for permitting opposite ends of said nut member to move through said first pair of slots when said nut member is moved from said first inoperative position, oriented substantially coaxially within said body portion, to said second operative position, oriented substantially perpendicular to said longitudinal axis of said body portion, so as to attain said second operative position, oriented substantially perpendicular to said longitudinal axis of said body portion, in order to fixedly retain said body portion mounted within the panel member;

a cross-brace member, integrally interconnecting said first pair of oppositely disposed side wall members of said body portion, for engaging said nut member when said nut member is disposed at said first inoperative position, oriented substantially coaxially within said body portion, so as to effectively define said first inoperative position, oriented substantially coaxially within said body portion, and for also engaging said nut member when said nut member is disposed at said second operative position, oriented substantially perpendicular to said longitudinal axis of said body portion, so as to define said second operative position, oriented substantially perpendicular to said longitudinal axis of said body portion, and thereby ensure that said nut member will be properly threadedly engaged by the threaded fastener;

a pair of pivot pins disposed upon side wall portions of said nut member for permitting said nut member to be pivotally moved from said first inoperative position, oriented substantially coaxially within said body portion, to said second operative position, oriented substantially perpendicular to said longitudinal axis of said body portion; and a second pair of oppositely disposed slots defined within said second oppositely disposed side wall members of said body portion for permitting said pivot pins of said nut member to move therewithin as said nut member is moved axially within said toggle-bolt fastener as said nut member is continually threadedly engaged by the threaded fastener, forward end portions of said second pair of oppositely disposed slots being disposed rearwardly of said cross-brace member such that when said nut member is pivotally moved from said first inoperative position, oriented substantially coaxially within said body portion, to said second operative position, oriented substantially perpendicular to said longitudinal axis of said body portion, said nut member will engage said cross-brace member whereby said cross-brace member will ensure that said nut member will be disposed substantially perpendicular to said longitudinal axis of said body portion so as to be properly threadedly engaged by the threaded fastener.

15. The toggle-bolt fastener assembly as set forth in claim 14, wherein:
said nut member comprises a solid nut member.

16. The toggle-bolt fastener assembly as set forth in claim 15, wherein:
said solid nut member is fabricated from a material selected from the group consisting of aluminum, steel, plastic, and zinc.

17. The toggle-bolt fastener as set forth in claim 14, wherein:
said nut member is fabricated from folded sheet metal.

18. The toggle-bolt fastener as set forth in claim 17, wherein:
a projection, selected from the group consisting of a bent ear, a tab, and a dimple, is provided upon said sheet metal nut member so as to retain said sheet metal nut member at said first, inoperative position, oriented substantially coaxially within said body portion.

19. The toggle-bolt fastener as set forth in claim 14, further comprising:
a head portion integrally formed upon one end portion of said body portion; and
arrow indicia disposed upon said head portion of said toggle-bolt fastener in a coplanar manner with said first pair of slots defined within said body portion, through which said opposite ends of said nut member will move, when said nut member is moved from said first axially oriented, inoperative position within said body portion, to said second operative position, oriented substantially perpendicular to said longitudinal axis of said body portion, so as to indicate to operator personnel the orientation of said opposite ends of said nut member whereby said nut member may be oriented vertically so as to maximize pull-out resistance values of said toggle-bolt fastener.

20. The toggle-bolt fastener as set forth in claim 14, further comprising:
a head portion integrally formed upon a first end portion of said body portion; and
a pointed tip portion integrally formed upon a second opposite end portion of said body portion.

21. The toggle-bolt fastener as set forth in claim 20, further comprising:
pocket structure, defined within said body portion so as to be radially offset from said longitudinal axis of said body portion and to be disposed axially rearwardly of said pointed tip portion, for accommodating a threaded fastener within said body portion of said toggle-bolt fastener such that a forward tip portion of the threaded fastener will not encounter said pointed tip portion of said toggle-bolt fastener whereby a single threaded fastener can mount different articles, having different thickness dimensions, upon the panel member while the single threaded fastener remains coaxially disposed within said toggle-bolt fastener.

22. The toggle-bolt fastener as set forth in claim 21, wherein:
said pocket structure comprises a composite semi-cylindrical, semi-conical structure integrally interconnecting opposite side wall members of said body portion of said toggle-bolt fastener and said pointed tip portion of said toggle-bolt fastener.

23. The toggle-bolt fastener as set forth in claim 21, wherein
said pocket means comprises a semi-cylindrical structure integrally interconnecting opposite side wall members of said body portion of said toggle-bolt fastener.

24. The toggle-bolt fastener as set forth in claim 21, wherein:
said pocket structure is defined by a pair of opposite side wall members of said body portion of said toggle-bolt fastener, said first pair of slots which are defined within said body portion between said pair of opposite side wall members for permitting said opposite ends of said nut member to move through said first pair of slots when said nut member is moved from said first inoperative position, oriented substantially coaxially within said body portion, to said second operative position, oriented substantially perpendicular to said longitudinal axis of said body portion, and a rear edge portion of said pointed tip portion.

25. The toggle-bolt fastener as set forth in claim 20, further comprising:

pocket means, defined within said body portion so as to be radially offset from said longitudinal axis of said body portion and to be disposed axially rearwardly of said pointed tip portion, for accommodating a threaded fastener within said body portion of said toggle-bolt fastener such that a forward tip portion of the threaded fastener will encounter said pointed tip portion of said toggle-bolt fastener and will be slightly deflected by said pointed tip portion of said toggle-bolt fastener whereby a single threaded fastener can mount different articles, having different thickness dimensions, upon the panel member as a result of the forward tip portion of the single threaded fastener bypassing said pointed tip portion of said toggle-bolt fastener.

26. The toggle-bolt fastener as set forth in claim 25, wherein:

said pocket means comprises a composite semi-cylindrical, semi-conical structure integrally interconnecting opposite side wall members of said body portion of said toggle-bolt fastener and said pointed tip portion of said toggle-bolt fastener.

27. The toggle-bolt fastener as set forth in claim 25, wherein:

said pocket means comprises a composite semi-conical structure integrally interconnecting opposite side wall members of said body portion of said toggle-bolt fastener and said pointed tip portion of said toggle-bolt fastener.

* * * * *